(12) United States Patent
Feldman et al.

(10) Patent No.: US 9,679,007 B1
(45) Date of Patent: Jun. 13, 2017

(54) TECHNIQUES FOR MANAGING REFERENCES TO CONTAINERS (71) Applicant: Veritas Technologies LLC, Mountain View, CA (US)

(72) Inventors: Daniel Joshua Feldman, Minneapolis, MN (US); Matthew Paul Navratil, Champlin, MN (US)

(73) Assignee: Veritas Technologies LLC, Mountain View, CA (US)

( * ) Notice: Subject to any disclaimer, the term of this patent is extended or adjusted under 35 U.S.C. 154(b) by 194 days.

(21) Appl. No.: 13/838,218

(22) Filed: Mar. 15, 2013

(51) Int. Cl.
*G06F 17/30* (2006.01)

(52) U.S. Cl.
CPC .............................. *G06F 17/30371* (2013.01)

(58) Field of Classification Search
CPC ......... G06F 17/30286; G06F 17/30067; G06F 17/30371
USPC ....................................................... 707/690
See application file for complete search history.

(56) References Cited

U.S. PATENT DOCUMENTS

| 8,108,446 | B1 * | 1/2012 | Christiaens | 707/816 |
| 8,290,972 | B1 * | 10/2012 | Deshmukh et al. | 707/758 |
| 8,402,004 | B2 * | 3/2013 | Provenzano et al. | 707/692 |
| 8,504,533 | B2 * | 8/2013 | Dewey et al. | 707/692 |
| 8,650,163 | B1 * | 2/2014 | Harnik et al. | 707/692 |
| 8,788,769 | B2 * | 7/2014 | Abercrombie et al. | 711/162 |
| 9,110,964 | B1 * | 8/2015 | Shilane | G06F 11/14 |
| 2010/0049735 | A1 * | 2/2010 | Hsu | G06F 17/30138 707/E17.005 |
| 2012/0030477 | A1 * | 2/2012 | Lu et al. | 713/189 |
| 2012/0159098 | A1 * | 6/2012 | Cheung | G06F 12/0261 711/162 |
| 2013/0036277 | A1 * | 2/2013 | Szczepkowski | G06F 3/0608 711/159 |
| 2013/0110767 | A1 * | 5/2013 | Tatemura | G06F 17/30315 707/607 |

OTHER PUBLICATIONS

Guohua Wang, Yuelong Zhao, Xiaoling Xie, and Lin Liu, Research on a clustering data de-duplication mechanism based on Bloom Filter, Published in:Multimedia Technology (ICMT), 2010 International Conference on, Date of Conference:Oct. 29-31, 2010, p. 1-5.*

* cited by examiner

*Primary Examiner* — Rehana Perveen
*Assistant Examiner* — Hicham Skhoun
(74) *Attorney, Agent, or Firm* — Wilmer Cutler Pickering Hale and Dorr LLP (57) ABSTRACT

Techniques for managing references to containers are disclosed. In one particular embodiment, the techniques may be realized as a method for managing references to containers comprising comparing at least one identifier to a first bloom filter, generating a first list of identifiers based on the comparison of the at least one identifier and the first bloom filter, comparing the first list of identifiers to a second bloom filter, generating a second list of identifiers based on the comparison of the first list and the second bloom filter, comparing the second list of identifiers to a main container list, and determining whether an image refers to a container based on the comparison of the second list and the main container list.

19 Claims, 7 Drawing Sheets

TECHNIQUES FOR MANAGING REFERENCES TO CONTAINERS

FIELD OF THE DISCLOSURE

The present disclosure relates generally to deduplication and, more particularly, to techniques for managing references to containers.

BACKGROUND OF THE DISCLOSURE

Container reference tracking in deduplication systems assists in keeping track of a relationship between pre-duplication images of data and post-duplication data arranged in containers. However, traditional methods of tracking and managing references between the images and the containers require managing a list of all references in memory and checking each reference to determine which images refer to a given container. As a result, traditional methods of tracking and managing references require a substantial amount of memory and CPU processing time to determine which images refer to a given container.

In view of the foregoing, it may be understood that there may be significant problems and shortcomings associated with traditional container reference tracking technologies.

SUMMARY OF THE DISCLOSURE

Techniques for managing references to containers are disclosed. In one particular embodiment, the techniques may be realized as a method for managing references to containers comprising comparing at least one identifier to a first bloom filter, generating a first list of identifiers based on the comparison of the at least one identifier and the first bloom filter, comparing the first list of identifiers to a second bloom filter, generating a second list of identifiers based on the comparison of the first list and the second bloom filter, comparing the second list of identifiers to a main container list, and determining whether an image refers to a container based on the comparison of the second list and the main container list.

In accordance with other aspects of this particular embodiment, the identifier is an image ID of an image of data.

In accordance with other aspects of this particular embodiment, the image of data is backup data.

In accordance with additional aspects of this particular embodiment, the first bloom filter and the second bloom filter are stored in a cluster.

In accordance with other aspects of this particular embodiment, the cluster includes a plurality of containers.

In accordance with further aspects of this particular embodiment, the cluster includes a reference counter for each of the plurality of containers.

In accordance with additional aspects of this particular embodiment, the first bloom filter includes a list of image identifiers that reference one of the plurality of containers.

In accordance with other aspects of this particular embodiment, the second bloom filter includes a list of image identifiers paired with container identifiers.

In accordance with further aspects of this particular embodiment, each of the pairs indicate that an image references a particular one of the plurality of containers within the cluster.

In accordance with additional aspects of this particular embodiment, the first bloom filter stores a plurality of image identifiers.

In accordance with other aspects of this particular embodiment, the identifier is read from a list of identifiers stored in memory.

In accordance with additional aspects of this particular embodiment, the main container list indicates containers that an image references.

In accordance with additional aspects of this particular embodiment, the method may further include identifying a container for analysis, determining which cluster includes the identified container, retrieving the first bloom filter from the determined cluster, and retrieving the second bloom filter from the determined cluster.

In accordance with other aspects of this particular embodiment, the method may further include generating the first bloom filter, and generating the second bloom filter.

In accordance with additional aspects of this particular embodiment, the method may further include separating an image into a plurality of first containers, comparing the plurality of first containers to previously stored containers, and storing at least one of the plurality of first containers based on the comparison of the plurality of first containers and the previously stored containers.

In accordance with other aspects of this particular embodiment, the method may further include generating the main container list.

In accordance with further aspects of this particular embodiment, the plurality of first containers are stored within a cluster.

In accordance with other aspects of this particular embodiment, the method may further include updating the first bloom filter and the second bloom filter based on the comparison of the plurality of first containers and the previously stored containers.

In another particular embodiment, the techniques may be realized as least one non-transitory processor readable storage medium storing a computer program of instructions configured to be readable by at least one processor for instructing the at least one processor to execute a computer process for performing a method for managing references to containers comprising comparing at least one identifier to a first bloom filter, generating a first list of identifiers based on the comparison of the at least one identifier and the first bloom filter, comparing the first list of identifiers to a second bloom filter, generating a second list of identifiers based on the comparison of the first list and the second bloom filter, comparing the second list of identifiers to a main container list, and determining whether an image refers to a container based on the comparison of the second list and the main container list.

In another particular embodiment, the techniques may be realized as a system for managing references to containers comprising one or more processors communicatively coupled to a network; wherein the one or more processors are configured to comparing an identifier to a first bloom filter, generating a first list of identifiers based on the comparison of the at least one identifier and the first bloom filter, comparing the first list of identifiers to a second bloom filter, generating a second list of identifiers based on the comparison of the first list and the second bloom filter, comparing the second list of identifiers to a main container list, and determining whether an image refers to a container based on comparison of the second list and the main container list.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
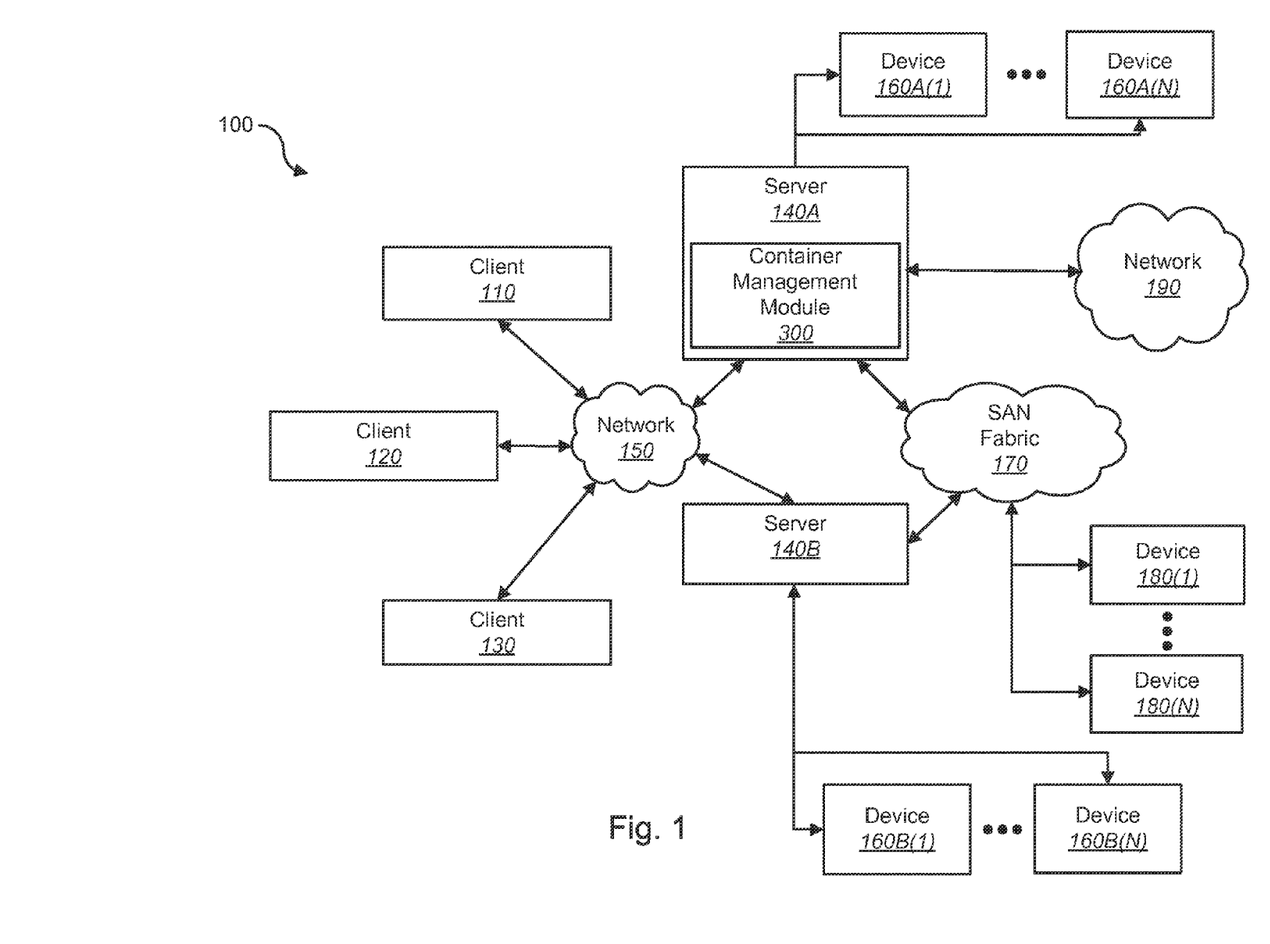
FIG. 1 shows a block diagram depicting a network architecture in accordance with an embodiment of the present disclosure.

FIG. 1 shows a block diagram depicting a network architecture for managing references to containers in accordance with an embodiment of the present disclosure. FIG. 1 is a simplified view of a network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may each contain a management module (e.g., container management module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
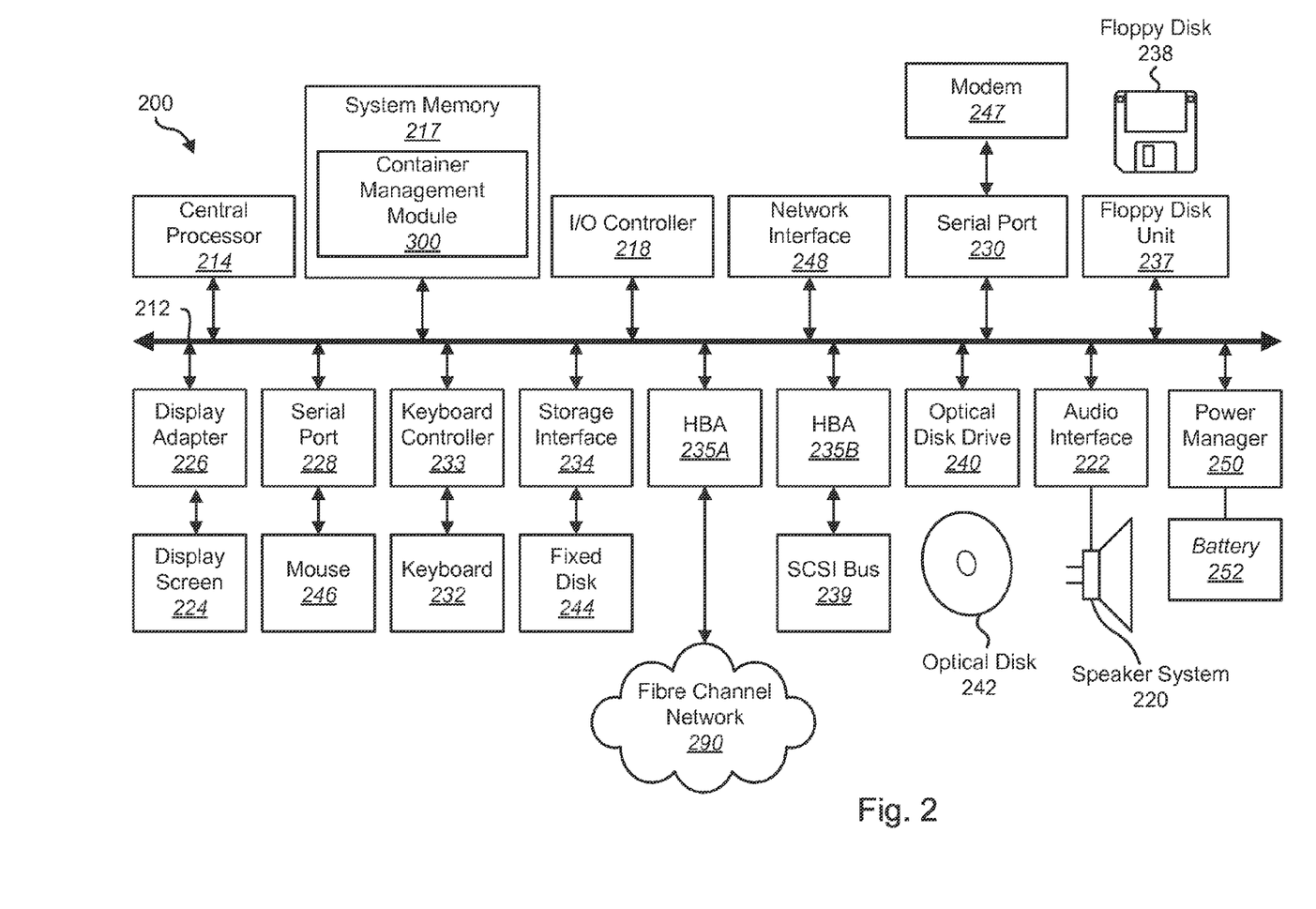
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A and 140B using, for example, a web browser or other client software (not shown). Such a client may allow client systems 110, 120 and 130 to access data hosted by any one of servers 140A and 140B or one of storage devices 160A(1)-(N), 160N(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160N(1)-(N), and/or 180(1)-(N) may be network accessible storage and may be local, remote, or a combination thereof to any one of servers 140A and 140B. Storage devices 160A(1)-(N), 160N(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160N(1)-(N), and/or 180(1)-(N) may be used for backup or archival purposes. For example, storage devices 160N(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160N(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors. Further, the one or more portions of data that have been backed up or archived may be recovered upon occurrence of a particular event according to a failover policy. Additionally, the one or more portions of data that have been backed up or archived may be subjected to a deduplication process.

According to some embodiments, server 140A may contain one or more portions of software for managing references to containers such as, for example, container management module 300. As illustrated, one or more portions of the container management module 300 may reside at a network centric location. For example, server 140A may be a server, a firewall, a gateway, or other network element that may perform one or more actions to manage container references. According to some embodiments, network 190 may be an external network (e.g., the Internet) and server 140A may be a gateway or firewall between one or more internal components and clients and the external network. According to some embodiments, the container management module 300 may be implemented as part of a cloud computing environment and implemented across multiple nodes or servers within the cloud computing environment.

FIG. 2 shows a block diagram of a computer system 200 in accordance with an embodiment of the present disclosure.

Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the container management module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
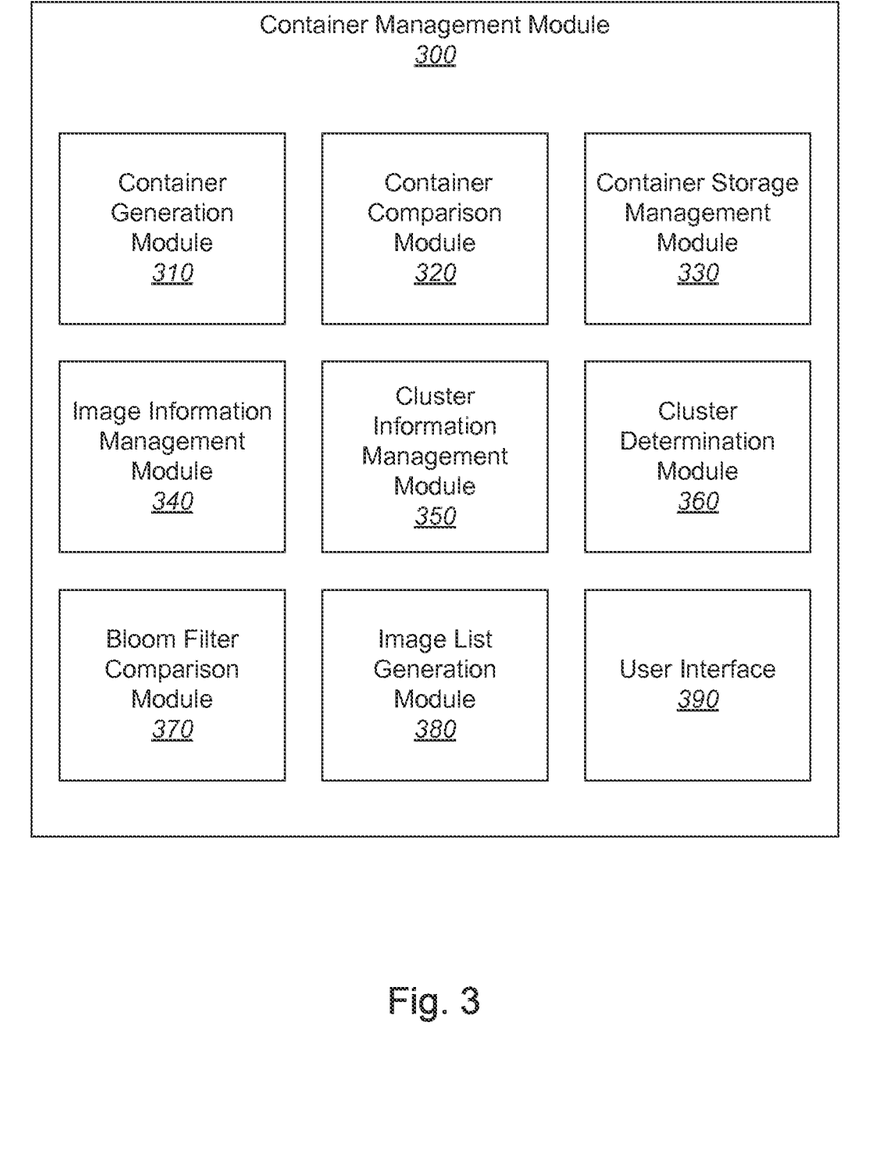
FIG. 3 shows a container management module in accordance with an embodiment of the present disclosure.

FIG. 3 shows a container management module 300 in accordance with an embodiment of the present disclosure. As illustrated, the container management module 300 may contain one or more components including a container generation module 310, a container comparison module 320, a container storage management module 330, an image information management module 340, a cluster information management module 350, a cluster determination module 360, a Bloom Filter comparison module 370, an image list generation module 380, and a user interface 390.

The container generation module 310 may separate an image into a plurality of containers. An image may be a logical file that a user stored in a deduplication system. In at least one example, the image is a backup of a computer. A container may be a physical file stored in a deduplication system that includes a portion of data from the image. In some instances, the size of a container may be less than the size of an image. Additionally, when there are multiple images and containers, the size of all of the containers may be smaller than the size of all of the images due to the deduplication of data in the deduplication system. For example, an image may be generated from computer data at a client, separated into a plurality of containers, and stored at a server which performs a deduplication process on the containers. The deduplication process may also be performed at the client side.

The container comparison module 320 may compare containers of new data generated by the container generation module 310 to previously stored containers. In some embodiments, the container comparison module 320 may compare the containers byte by byte. However, the containers may be compared in any number of appropriate ways.

The container storage management module 330 may store the containers generated by the container generation module 310 in a storage system. In some embodiments, the containers may be stored in a deduplication storage system separate from the images. For example, the images may be stored at a first location and the containers subject to deduplication may be stored at a second location. Additionally, the containers may be grouped into clusters. Clusters may contain any number of containers (i.e., 1024 containers). In some instances, the container storage management module 330 may store the generated containers in different clusters depending the creation time of the containers.

Each cluster may include the containers, identifiers for each of the containers (i.e., 1024 container identifiers, 8 KB), reference counts for each of the containers (i.e., 1024 container identifiers, 8 KB), a first Bloom Filter (i.e., Bloom Filter A) that stores the image ID of each image that references a container in the cluster, and a second Bloom Filter (i.e., Bloom Filter B) that stores image ID and container ID pairs (i.e., image ID||container ID). In some instances, the image ID and container IDs are generated using a concatenation operation for every image-container pair in the cluster.

In some embodiments, a Bloom Filter is a probabilistic data structure that can store a set of values using very little space. The set of values of the Bloom Filter may be added to and/or queried. Each time a new value is to be added, the Bloom Filter may be ORed with many different hashes of the new member. However, Bloom Filters may return false positives and as the size of the set of values stored in the Bloom Filter increases a false positive rate also increases.

The size of the Bloom Filters may be varied depending on expected data characteristics such as deduplication rate, temporal locality, and spatial locality of the data. For example, with 99% deduplicated data, each container may include $2^7$ references or $2^{17}$ references per cluster. In this example, a Bloom Filter may store this data set with a 1% false positive rate in about 153 kilobytes such that total consumption is 306 kilobytes per cluster.

The image information management module 340 may generate and store for each image, a list of containers that the image refers to. This list may be generated based on the containers stored by the container storage management module 330. In addition, when it is determined by the container comparison module 320 that a newly generated container matches a previously stored container, the image information management module 340 may add the matching container to the list. This list may be maintained separate from the images and clusters of containers.

The cluster information management module 350 may generate and update the information associated with each cluster of containers. In some embodiments, the cluster information management module 350 may generate and/or update a reference count for each of the containers within a cluster, a first Bloom Filter for the cluster, and a second Bloom Filter for the cluster. Upon addition of an image in the system, the cluster information management module 350 may update the relevant cluster information accordingly. For example, upon the addition of one image and five corresponding containers in the cluster, the cluster information management module 350 may generate a reference count of one (1) for each new cluster and update the first and second Bloom Filters. Alternatively, upon the deletion of an image and associated container reference, the cluster information management module 350 may decrement the reference count by one. Further, the container storage management module 330 may delete a container when its reference count is decremented to zero by the cluster information management module 350.

In one example, one image (image A) may be separated into ten (10) corresponding containers (C1-C10) which are stored in a first cluster (cluster X1). The cluster information management module 350 may generate a reference count for each container (C1-C10) such that the count is one (1), a first Bloom Filter containing only one image ID (image A), and a second Bloom Filter containing ten image ID/container ID pairs (i.e., image A:container C1, image A:container C2, . . . ). Upon the addition of a new image (image B) having five (5) containers that match five of the existing containers (C6-C10), the cluster information management module 350 may update the cluster information accordingly. That is, the cluster information management module 350 may increment the reference count for each of the clusters (C6-C10) to two (2), update the first Bloom Filter to include a second the second image ID (image B), and the second Bloom Filter to contain five new image ID/container ID pairs (i.e., image B:container C6, image B:container C7, . . . ).

The cluster determination module 360 may determine which cluster out of a plurality of clusters contains a particular container. For example, the system may include 100 clusters which each contain 1024 containers and cluster determination module 360 may determine and identify which particular cluster includes a certain container.

The Bloom Filter comparison module 370 may compare a list of image IDs to the list of image IDs stored in the first Bloom Filter of any cluster. In addition, the Bloom Filter comparison module 370 may compare a list of image IDs to the list of image ID and container ID pairs stored in the second Bloom Filter of any cluster.

The image list generation module 380 may generate a list of images that may refer to a given container based on the results from the Bloom Filter comparison module 370. In addition, the image list generation module 380 may generate a list of images that may refer to a given container based on the results from the Bloom Filter comparison module 370.

The user interface 390 may provide a user interface to allow a user to control any aspect of the container management module.

Figure 4:
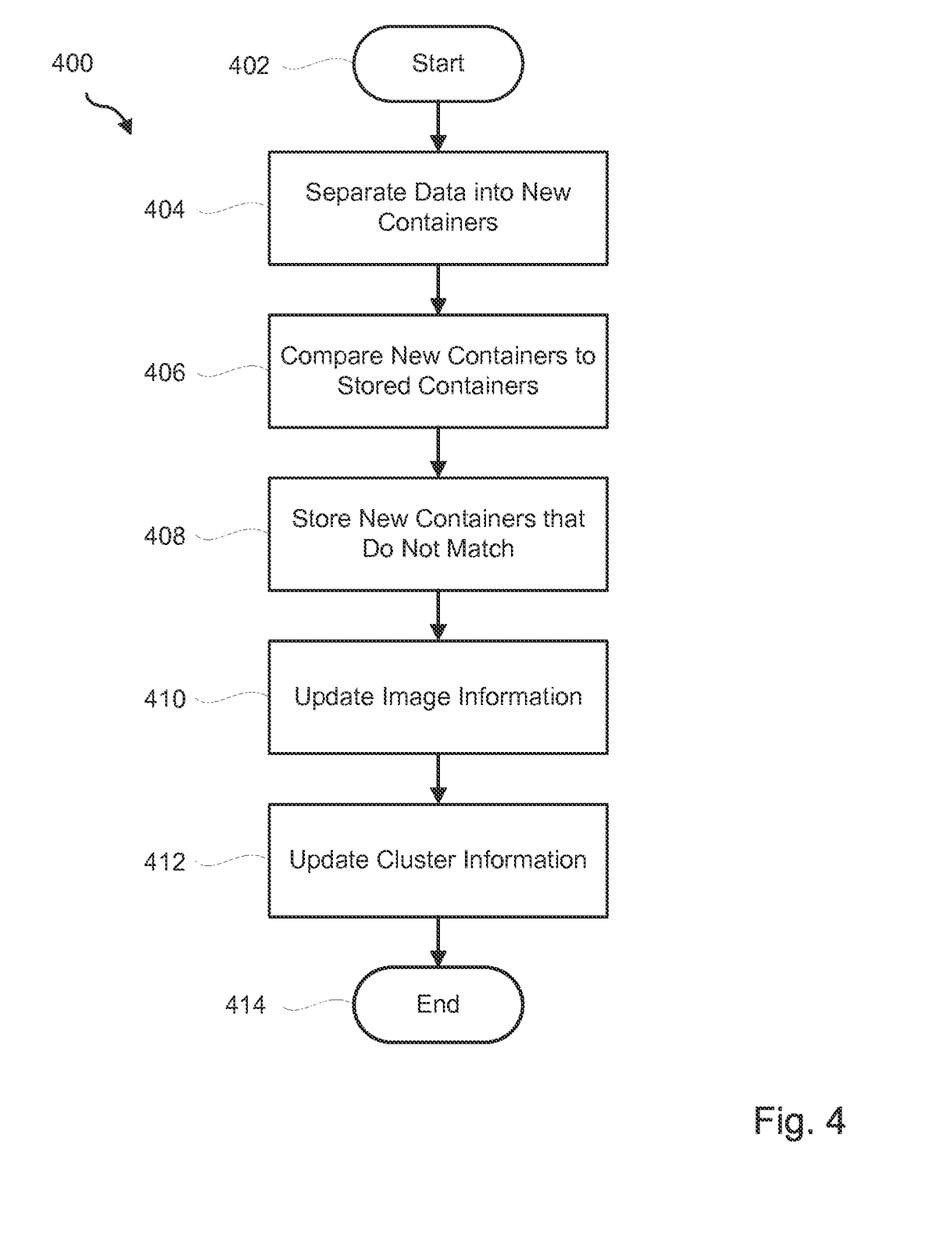
FIG. 4 shows a method for backing up image data in accordance with an embodiment of the present disclosure.

FIG. 4 shows a method 400 for backing up image data in accordance with an embodiment of the present disclosure. At block 402, the method 400 may begin.

At block 404, new data to be backed up may be separated into containers. In some embodiments, the container generation module 310 may separate the data into containers. The new data may be an image which is a logical file that includes a backup of data. The container may be a physical file stored on a disk of a server separate from the image. The containers may be of any appropriate size for the backup and deduplication system. For example, each container may be four (4) megabytes, six (6) megabytes, eight (8) megabytes, ten (10) megabytes, sixteen (16) megabytes, or any other appropriate size. In on example, an image having a size of 100 MB may be separated into ten containers each having ten (10) megabytes. After the image has been separated into the containers, the process may proceed to block 406.

At block 406, the new containers generated at block 404 may be compared to containers previously stored as part of the deduplication process. In some embodiments, the container comparison module 320 may compare the new containers to the previously stored containers. In at least one instance, it may be determined that all of the new containers generated at block 404 do not correspond to any of the containers previously stored. However, in another instance, it may be determined that at least one of the new containers match the previously stored containers. For example, it may be determined that 50% of the containers generated at block 404 correspond to containers previously stored. That is, the matching containers each may contain the same data such that it is not necessary to store the same data twice according to the deduplication policy.

At block 408, any containers that were determined to not match the previously stored containers at block 406 may be stored along with the previously stored containers. In some embodiments, the container storage management module 330 may store the new containers. In at least one embodiment, the new containers and the previously stored containers may be stored in clusters. For example, each cluster of containers may include a group of 1024 containers or any other appropriate number of containers. The grouping of the containers in the clusters may be based on the time at which the container was created. In some embodiments, each cluster of containers may contain an identifier of each of the containers, a reference count for each of the containers, a first Bloom Filter (i.e., Bloom Filter A), and a second Bloom Filter (i.e., Bloom Filter B). The new containers may be stored in the same cluster as the older containers or in a separate cluster. After the new containers that do not match any of the previously stored containers have been stored, the process may proceed to block 410.

At block 410, information indicating which clusters the image refers to may be stored in memory. In some embodiments, the image information management module 340 may store the information indicating that a particular image refers to a particular container. For example, image A1 may be separated into ten (10) containers at block 404, all of the ten containers may be stored in cluster X at block 408, and information identifying each associated container may be stored in memory. In this example, the information identifying the containers may be a container identifier (i.e., Container C1, C2, . . . C10). Accordingly, a list of all of the containers that the particular image refers to may be stored.

In another example, image B may be separated into ten (10) containers at block 404, five of the ten containers may be determined to match at block 406, the remaining containers may be stored in cluster Y at block 408, and information identifying each associated container may be stored in memory. In this example, containers C5-C10 in cluster X may be determined to match the first five containers of image B and the remaining containers may be stored as containers C11-C15 in cluster Y. Accordingly, information may be stored that indicates that image B refers to containers C5-C10 and container C11-C15. After the image information has been updated, the process may proceed to block 412.

At block 412, cluster information may be updated to reflect the new image. In some embodiments, the cluster information management module 350 may update the cluster information. The cluster information to be updated may include the cluster's first Bloom Filter (i.e., Bloom Filter A), the cluster's second Bloom Filter (i.e., Bloom Filter B), and a reference count in cluster's reference count array. In the above-noted example, an identifier or ID for the new image (i.e., image AA) may be stored in the cluster's first Bloom Filter. The cluster's first Bloom Filter (i.e., Bloom Filter A) may contain a list of all image IDs that refer to any container within the cluster such that when a new container is added to the cluster the corresponding image ID may be added or when a new image refers to an existing container the corresponding image ID may also be added.

Further, the identifier or ID for the new image (i.e., image AA) in conjunction with each of the particular containers that the image refers to may be stored in the cluster's second Bloom Filter. In some embodiments, the image ID and the container ID may be concatenated and stored in the cluster's second Bloom Filter (i.e., Bloom Filter B). Accordingly, the cluster's second Bloom Filter may contain a list of each image-container pair within the cluster. After the cluster information has been updated the process may proceed to block 414.

At block 414, the process may end. In some embodiments, the process may proceed back to step 402 and repeated periodically or continuously. In addition, the process may proceed back to step 402 and await the addition of a new image.

Figure 5:
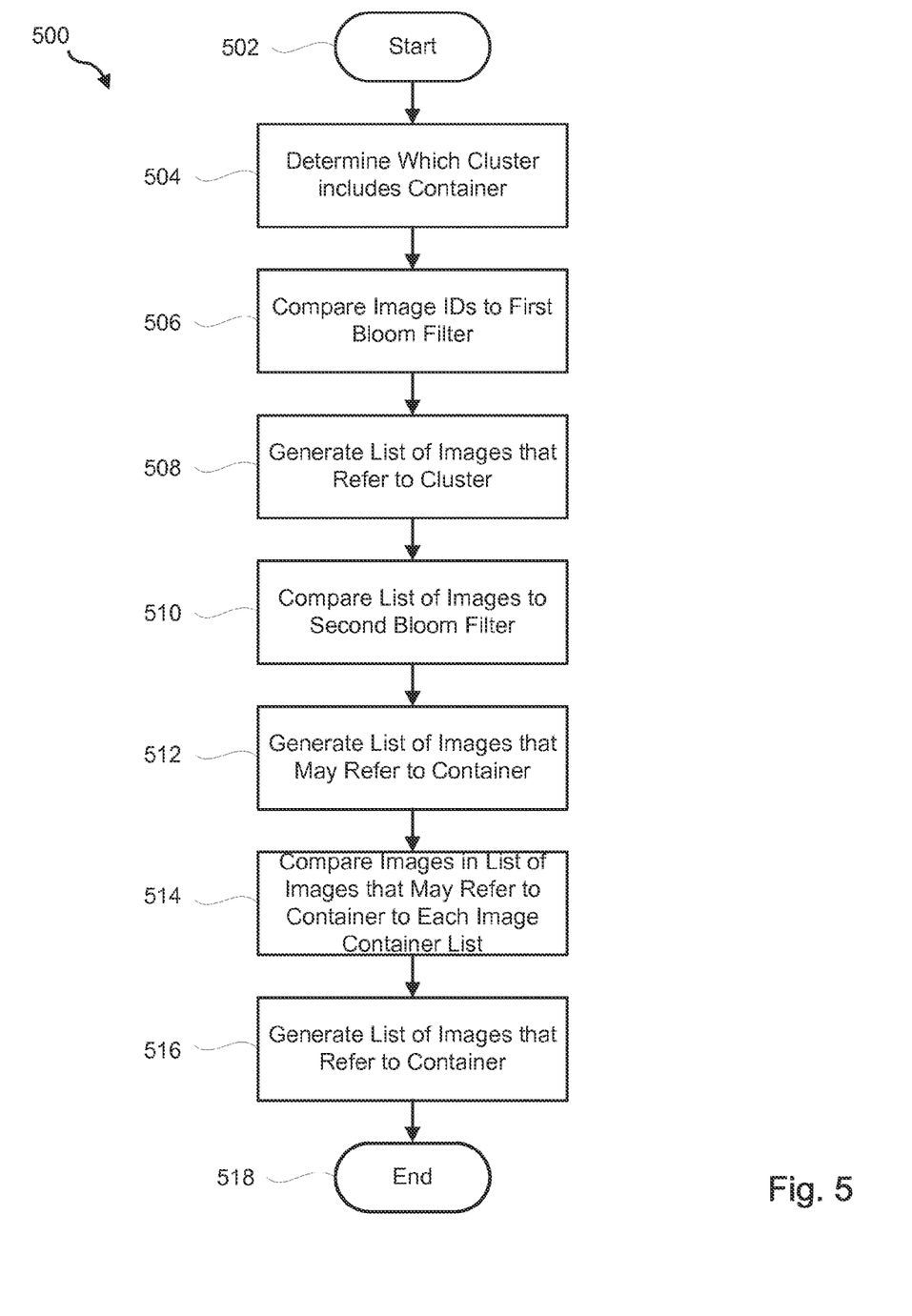
FIG. 5 shows a method for determining images that refer to a container in accordance with an embodiment of the present disclosure.

FIG. 5 shows a method 500 for generating a list of images that refer to a particular container in accordance with an embodiment of the present disclosure. In some embodiments, this process may be performed upon the occurrence of a hardware failure storing the particular container. As a result of such a failure, it may be necessary to determine which images refer to the particular container such that the data can be recovered and properly backed up again. At block 502, the method 500 may begin.

At block 504, it may be determined which cluster contains the particular container (i.e., container C5) of interest. In some embodiments, the cluster determination module 360 may determine which cluster includes the particular container. The backup and deduplication system may store numerous clusters which each contain a plurality of containers and at block 504, the cluster that contains the particular container may be identified. For example, it may be determined that cluster X includes container C5. In some embodiments, the cluster including the particular container may be determined from high bits of a container ID corresponding to the particular container. After the cluster which includes the container of interest has been determined, the process may proceed to block 506.

At block 506, each image ID may be compared to the first Bloom Filter of the cluster identified at block 504. In some embodiments, the Bloom Filter comparison module 370 may compare the image IDs to the first Bloom Filter of the identified cluster. The first Bloom Filter may contain a list of image IDs that refer to at least one container of post-deduplication backup data within the cluster. For example, fifty (50) images of pre-deduplication data may have been separated into containers and stored in clusters as post-deduplication data according the processed described above and shown in FIG. 4. A separate list of image IDs (i.e., image AA, AB, . . . ) corresponding to the fifty images may be maintained and each image ID within that list may be compared to the list of image IDs included in the first Bloom Filter. After the list of all image IDs has been compared to the list of image IDs within the first Bloom Filter, the process may proceed to block 508.

At block 508, a list of images that may refer to the cluster may be generated. In some embodiments, the image list generation module 380 may generate the list of images that refer to the cluster. The list of images that may refer to the cluster may refer to the container of interest or other containers within the cluster. For example, at block 506 it may be determined that ten (10) of the original fifty images (images AA, AB, AC, AD, and AE) may refer to the cluster (i.e., cluster X) that includes the particular container (i.e., container C5). After the list of images that refer to the cluster has been generated, the process may proceed to block 510.

In some embodiments, the comparison at block 508 may contain a false positive indicating that an image refers to the cluster when in fact it does not. Accordingly, an additional step of comparing a false positive rate of the second Bloom Filter (i.e., Bloom Filter B) to a threshold may be provided. The false positive rate of the second Bloom Filter may be determined by using the reference count array for the cluster and the second Bloom Filter's bit count. If it is determined that the false positive rate of the second Bloom Filter exceeds the threshold then an error may be returned. However, if it is determined that the false positive rate of the second Bloom Filter does not exceed the threshold then the process may proceed to block 510.

At block 510, the list of images generated at block 508 may be compared to the second Bloom Filter. In some embodiments, the Bloom Filter comparison module 360 may compare the list of images generated at block 508 to the second Bloom Filter. For example, the list of image IDs that may refer the cluster may be compared to a list of image ID/container ID pairs in the second Bloom Filter. Further to the example disclosed above, the list of image IDs (images AA, AB, AC, AD, and AE) corresponding to the images that may refer to the cluster (i.e., cluster X) that includes the particular container (i.e., cluster C5) are compared to the second Bloom Filter in the cluster (i.e., cluster X) to determine which of the images may refer to the particular cluster (i.e., cluster X).

Based on the comparison, it may be determined that at least one of the images in the list of images may refer to the particular container. For example, it may be determined that images AB and AC may refer to container C5 in cluster X. That is, each of the image IDs AA-AE may be compared with the image ID/container ID pairs (i.e., image AA∥container C1, image AA∥container C2, . . . ) in the second Bloom Filter to identify the which images probably refer to container C5 and exclude those that do not. After the list of image IDs has been compared to the second Bloom Filter, the process may proceed to block 512.

At block 512, a list of images that may refer to the particular container may be generated. In some embodiments, the image list generation module 380 may generate the list of images that likely refer to the particular container. Further to above described example, the list generated at block 512 may include images AB and AC. Because the Bloom Filter may return false positives, it is possible that some of the images listed do not actually refer to the particular container of interest (i.e., container C5). Accordingly, the process may proceed to block 514 after the list of images that may refer to the particular container has been generated.

At block 514, a container list for each of the images included in the list of images that may refer to the container may be checked. In some embodiments, the image information management module 340 may check the container list of each of the identified images. The container list for each image may be generated at block 410 in the process 400 shown in FIG. 4. In the above-noted example, a list of known containers that each of the images AB and AC reference may be retrieved from memory and checked to determine whether images AB and AC actually do reference container C5. Advantageously, only the in memory container lists for two images (AB and AC) need to be checked instead of the container lists for all fifty images to determine which of the fifty images actually refer to the particular container. After the in memory container lists have been checked, the process may proceed to block 516.

At block 516, a list of images that do refer to the particular container may be generated. In some embodiments, the image list generation module 380 may generate the list of images that actually refer to the particular container. For example, it may be determined that image AC actually refers to container C5 by checking the in memory container list for image AC whereas image AB may be determined to be a false positive. Accordingly, the list of images that actually refer to container C5 may include image AC and exclude image AB. However, it may be determined that image AB and AC actually reference container C5 based on the check of each of the in memory container lists. Based on the list of containers that actually refer to the particular container of interest, data stored in the container may be quickly recovered in the event of a hardware or software failure. After the list of images that actually refer to the container has been generated, the process may proceed to block 518.

At block 518, the process may end. In some embodiments, the process may proceed back to step 502 and repeated periodically or continuously.

Figure 6:
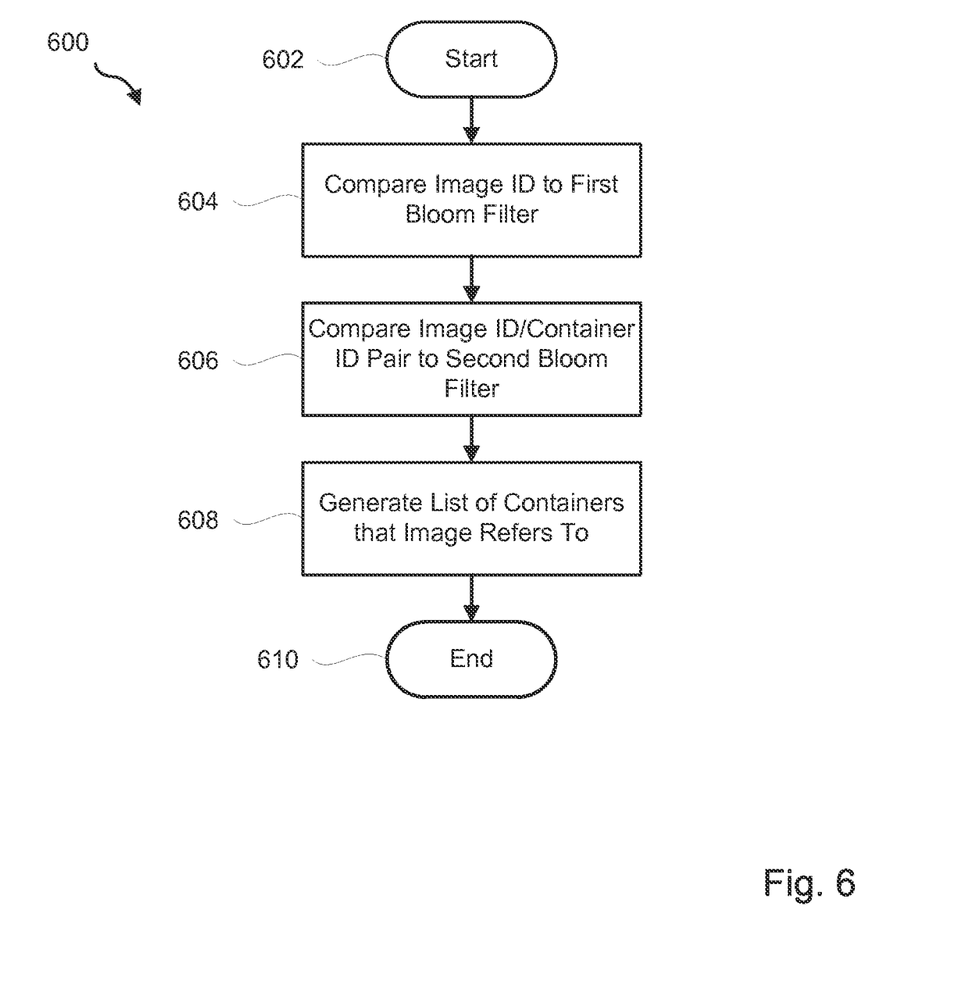
FIG. 6 shows a method for generating a list of containers that an image references in accordance with an embodiment of the present disclosure.

FIG. 6 shows a method 600 for generating a list of containers that an image references in accordance with an embodiment of the present disclosure. In some embodiments, the method 600 may be performed for each cluster within the system. At block 602, the method 600 may begin.

At block 604, an image ID for a particular image may be compared to the cluster's first Bloom Filter (i.e., Bloom Filter A). In some embodiments, the Bloom Filter comparison module 370 may compare an image ID to the first Bloom Filter. If it is determined that the image ID is contained within the first Bloom Filter, the process may proceed to block 606. However, if it is determined that the image ID is not contained within the first Bloom Filter, the process may proceed back to block 602 such that another cluster may be checked.

At block 606, it may be determined if an image ID/container ID pair is included in the cluster's second Bloom Filter (i.e., Bloom Filter B). In some embodiments, the Bloom Filter comparison module 370 may determine if the image ID/container ID pair is included in the cluster's second Bloom Filter. That is, at block 606 it may be determined whether a particular container is associated with the particular image ID. This process may be repeated for each container within the cluster. After the second Bloom Filter has been checked, the process may proceed to block 608.

At block 608, a list of containers that the particular image refers to may be generated. In some embodiments, the list of containers that the particular image refers to is generated to include each of the containers that were determined to have an image ID/container ID pair at block 606.

At block 610, the process may end. In some embodiments, the process may proceed back to step 602 and repeated periodically or continuously.

Figure 7:
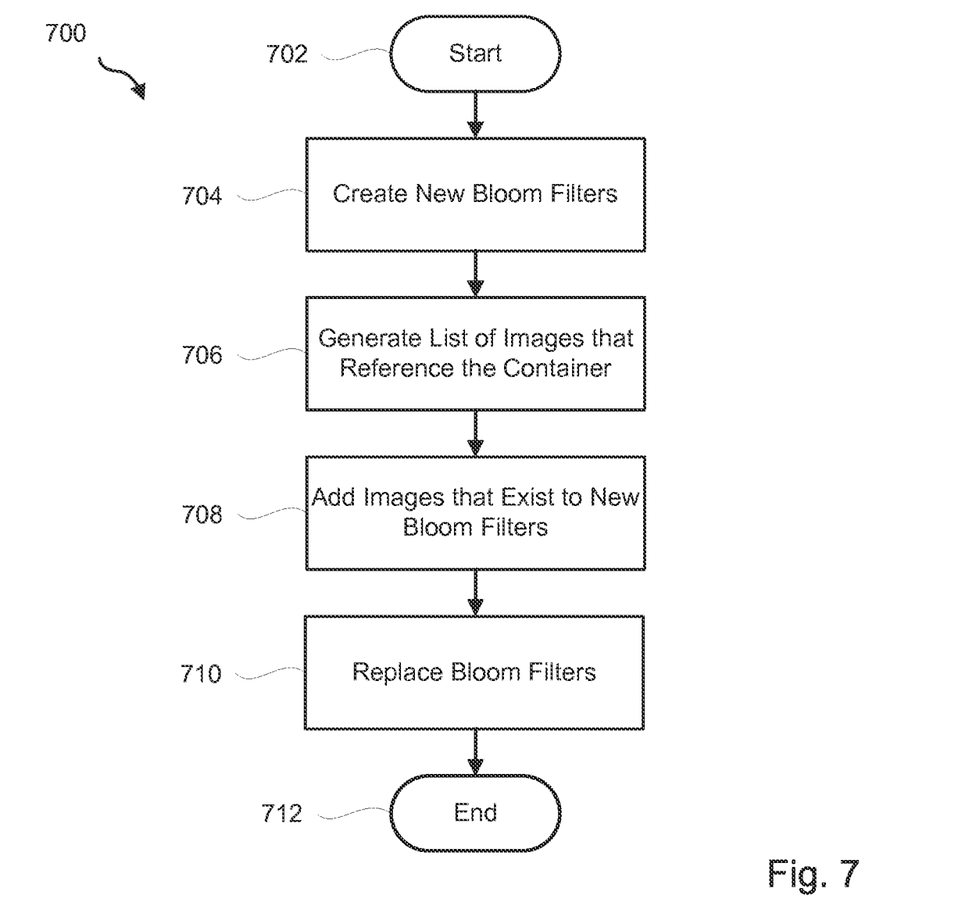
FIG. 7 shows a method for rebuilding Bloom Filters in accordance with an embodiment of the present disclosure.

FIG. 7 shows a method 700 for rebuilding the Bloom Filters in accordance with an embodiment of the present disclosure. In some embodiments, the method 700 may be performed for each cluster within the system. In some instances, extra image references been exist after an image has been deleted such that the Bloom Filters may be rebuilt to remove extraneous image references. At block 702, the method 700 may begin.

At block 704, a new first Bloom Filter and a new second Bloom Filter may be created. In some embodiments, the cluster information management module 350 may generate the new Bloom Filters (i.e., Bloom Filter A' and Bloom Filter B'). After the new first Bloom Filter and the new second Bloom Filter have been created, the process may proceed to block 706.

At block 706, the list of images that reference a particular container may be generated. Based on the generated list, the images that actually exist (i.e., have not been deleted) may be added to the new Bloom Filters. In some embodiments, the generation of the list of images that reference the particular container may be performed according to the process described above in FIG. 5. This process may be repeated for each container within the cluster. After the list of images that reference the particular container has been generated, the process may proceed to block 708.

At block 708, the new Bloom Filters (i.e., Bloom Filter A' and Bloom Filter B') may replace the previous Bloom Filters (i.e., Bloom Filter A and Bloom Filter B). In some embodiments, the cluster information management module 350 may replace the Bloom Filters. The process may be repeated for each cluster in the system until all of the Bloom Filters have been rebuilt. In some embodiments, the process 700 may be performed periodically and/or when the system is being operated at a reduced demand (i.e., certain clients are offline).

At block 712, the process may end. In some embodiments, the process may proceed back to step 702 and repeated periodically or continuously.

At this point it should be noted that management of references to containers in accordance with the present disclosure as described above may involve the processing of input data and the generation of output data to some extent. This input data processing and output data generation may be implemented in hardware or software. For example, specific electronic components may be employed in management of disaster recovery sites or similar or related circuitry for implementing the functions associated with management of references to containers in accordance with the present disclosure as described above. Alternatively, one or more processors operating in accordance with instructions may implement the functions associated with management of references to containers in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing references to containers comprising:
   identifying a container stored in memory for analysis;
   determining, using at least one computer processor, a cluster that includes the identified container;
   retrieving a first bloom filter from the determined cluster, the first bloom filter storing image identifiers that reference containers within the determined cluster;
   retrieving a second bloom filter from the determined cluster, the second bloom filter storing pairs of the image identifiers concatenated with container identifiers for the containers within the determined cluster, wherein the second bloom filter is different from the first bloom filter;
   comparing at least one image identifier to the first bloom filter;
   generating a first list of image identifiers based on the comparison of the at least one image identifier and the first bloom filter;
   comparing the generated first list of image identifiers to the second bloom filter;
   generating a second list of image identifiers based on the comparison of the first list and the second bloom filter;
   determining a false positive rate of the second bloom filter based on a bit count of the second bloom filter;
   comparing the false positive rate of the second bloom filter to a predetermined threshold;
   comparing the generated second list of image identifiers to a main container list when it is determined that the false positive rate does not exceed the predetermined threshold; and
   determining whether an image refers to the identified container based on the comparison of the second list and the main container list.

2. The method of claim 1, wherein the image identifier is an image ID of an image of data.

3. The method of claim 2, wherein the image of data is backup data.

4. The method of claim 1, wherein the first bloom filter and the second bloom filter are stored in the determined cluster.

5. The method of claim 4, wherein the cluster includes a plurality of containers.

6. The method of claim 5, wherein the cluster includes a reference counter for each of the plurality of containers.

7. The method of claim 5, wherein the first bloom filter includes a list of image identifiers that reference one of the plurality of containers.

8. The method of claim 5, wherein the second bloom filter includes a list of image identifiers paired with container identifiers.

9. The method of claim 8, wherein each of the pairs indicate that an image references a particular one of the plurality of containers within the cluster.

10. The method of claim 1, wherein the at least one image identifier is read from a list of image identifiers stored in the memory.

11. The method of claim 10, wherein the main container list indicates containers that an image references.

12. The method of claim 1, further comprising:
   generating the first bloom filter; and
   generating the second bloom filter.

13. The method of claim 1, further comprising:
   separating an image into a plurality of first containers;
   comparing the plurality of first containers to previously stored containers; and
   storing at least one of the plurality of first containers based on the comparison of the plurality of first containers and the previously stored containers.

14. The method of claim 13, further comprising:
   generating the main container list.

15. The method of claim 13, wherein the plurality of first containers are stored within a cluster.

16. The method of claim 15, further comprising:
   updating the first bloom filter and the second bloom filter based on the comparison of the plurality of first containers and the previously stored containers.

17. At least one non-transitory processor readable storage medium storing a computer program of instructions configured to be readable by at least one processor for instructing the at least one processor to execute a computer process for performing the method as recited in claim 1.

18. A system for managing references to containers comprising:
   one or more computer processors and memory communicatively coupled to a network;
   wherein the memory contains instructions that when executed by the one or more computer processors cause the one or more computer processors to:
      identify a container for analysis;

determine a cluster that includes the identified container;

retrieve a first bloom filter from the determined cluster, the first bloom filter storing image identifiers that reference containers within the determined cluster;

retrieve a second bloom filter from the determined cluster, the second bloom filter storing pairs of the image identifiers concatenated with container identifiers for the containers within the determined cluster, wherein the second bloom filter is different from the first bloom filter;

compare an image identifier to the first bloom filter;

generate a first list of image identifiers based on the comparison of the at least one identifier and the first bloom filter;

compare the generated first list of image identifiers to the second bloom filter;

generate a second list of image identifiers based on the comparison of the first list and the second bloom filter;

determine a false positive rate of the second bloom filter based on a bit count of the second bloom filter;

compare the false positive rate of the second bloom filter to a predetermined threshold;

compare the generated second list of image identifiers to a main container list when it is determined that the false positive rate does not exceed the predetermined threshold; and determine whether an image refers to the identified container based on comparison of the second list and the main container list.

19. The method of claim 3, wherein a size of the first and second bloom filters is dependent on at least one of a deduplication rate, temporal locality, and spatial locality of the backup data.

* * * * *